US007560645B2

(12) United States Patent
King, Jr. et al.

(10) Patent No.: US 7,560,645 B2
(45) Date of Patent: Jul. 14, 2009

(54) TWIST-ON WIRE CONNECTOR

(76) Inventors: Lloyd Herbert King, Jr., 394 Larimore Valley Dr., Chesterfield, MO (US) 63005; Michael Belgeri, 1007 Bridgeport, Ellisville, MO (US) 63011; James C. Keeven, 2641 Whitetail La., O'Fallon, MO (US) 63368; Frank Vlasaty, 12 Lakeview Dr., St. Louis, MO (US) 63367; William Hiner, 8 Briarcastle Ct., O'Fallon, MO (US) 63368

( * ) Notice: Subject to any disclaimer, the term of this patent is extended or adjusted under 35 U.S.C. 154(b) by 140 days.

(21) Appl. No.: 11/515,465

(22) Filed: Sep. 1, 2006

(65) Prior Publication Data

US 2007/0084620 A1 Apr. 19, 2007

Related U.S. Application Data

(63) Continuation-in-part of application No. 11/249,868, filed on Oct. 13, 2005, now abandoned.

(51) Int. Cl.
*H02G 15/08* (2006.01)

(52) U.S. Cl. .......................................................... 174/87

(58) Field of Classification Search .................. 174/87; D13/150; D26/1, 10; 439/415
See application file for complete search history.

(56) References Cited

U.S. PATENT DOCUMENTS 6,478,606 B1 * 11/2002 McNerney et al. .......... 439/415
2002/0050387 A1 * 5/2002 Blaha et al. .................... 174/87

* cited by examiner

*Primary Examiner*—Chau N Nguyen
(74) *Attorney, Agent, or Firm*—Jacobson & Johnson LLC

(57) ABSTRACT

A twist-on wire connector having a finger friendly unbiased cushioned cover that covers not only the normal hand gripping region but at least part or all of the normal non-hand gripping region of the twist-on wire connector so that regardless of the way the twist-on wire connector is grasped the user fingers engage the cushioned cover to inhibit finger and hand injury and fatigue from repeated securement of twist-on wire connectors to electrical leads and a method of making a twist-on wire connector with a cushioned cover by placing a soft to the touch material on the exterior surface of the twist-on wire connector.

7 Claims, 10 Drawing Sheets

TWIST-ON WIRE CONNECTOR

CROSS REFERENCE TO RELATED APPLICATIONS

This application is a continuation in part of U.S. patent application Ser. No. 11/249,868 filed Oct. 13, 2005 now abandoned titled Cushioned Wire Connector.

FIELD OF THE INVENTION

This invention relates generally to twist-on wire connectors and, more specifically, to a finger friendly twist-on wire connector that provides three-axis deflection regardless of the users finger position.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of twist-on wire connector with a cushioned grip is known in the art, more specifically Blaha U.S. Pat. No. 6,677,530 discloses numerous embodiments of twist-on wire connectors and points out that the cushioned grip is on a portion of the exterior hard shell with the cushioned grip being an olefinic thermoplastic vulcanizate sold under the name Santoprene®, a trademark of Advanced Elastomer system of Akron, Ohio. Blaha describes a twist-on wire connector wherein the exterior of the wire connector shell has three main areas, a closed end section, a skirt and a grip mounting portion. The grip mounting portion is the region the user engages with his or her fingers in order to twist the wire connector into engagement with an electrical wire or wires.

Blaha points out that with molds of particularly close tolerances, such as found in the Twister® wire connector a cushioned grip can be formed over the Twister® wire connector without the use of boundary edges. The twist-on wire connector with a cushioned grip on the grip mounting portion is sold by Ideal Industries Inc. under the name Twister® PRO and is shown in the web page download from the Ideal Industries which is included with the 1449 material information statement of the present application.

Blaha points out the problem of installing twist-on wire connectors with a hard shell is that if numerous connections are made the hard plastic surface can be painful on the fingers or in certain instances the shell surface can be slippery due to the sweat or soil on the users hand. As a solution to the problem Blaha proposes to place a cushioned material over the hand gripping portions of the wire connector to make the wire connector more comfortable to grasp. While Blaha recognizes that the placement of cushion grip on the grip mounting portion of the twist-on wire connector can reduce fatigue Blaha does not recognize that not everyone grasps the twist-on wire connectors in the same manner or that because of cramped conditions it might not be possible to grasp the twist-on wire connector on the grip mounting portions to enable the user to benefit from the cushioned grip of Blaha. Consequently, while the Blaha twist-on wire connector has a cushioned grip it can be of little benefit to those users who do not grip the twist-on wire connector on the normal designated gripping portions or those user who might have to apply a twist-on wire connector in a location with inadequate space to position the users hand or fingers around the normal hand gripping regions of the twist-on wire connector. While Blaha U.S. Pat. No. 6,677,530 shows multiple embodiments of his cushioned grip in each of his embodiments he places his cushioned grip at the base or open end of his wire connector while leaving the end section of his wire connector proximate the closed end of the wire connector with the hard shell exposed. Ironically, if the twist-on wire connector is to be applied in a tight location it is the uncushioned end section which the user grasps to twist the wire connector onto the wires. Since the end section usually has a smaller radius than the base or normal finger grasping portion increased hand or finger pressure is required to obtain necessary torque to apply the twist-on wire connector. Thus, when application conditions are the most difficult one not only does one not have the benefit of cushioned grip for the users fingers but one has to generate greater hand force on the twist-on wire connector to obtain the necessary torque to bring the wire connector into engagement with the electrical wires therein.

Krup U.S. Pat. No. 3,519,707 illustrates another type of twist-on wire connector wherein a vinyl shield with ribs is placed around an exteriors surface of rigid cage that has sufficient strength and rigidity to drive the spring onto a cluster of wires. Krup states the purpose of his vinyl shell around the rigid case is to insulate and protect the connector and the wire connector. However, Krup fails to teach the vinyl shell located around his rigid cage comprises a cushioned surface.

McNerney U.S. Pat. No. 6,478,606 shows a twist-on wire connector with a tensioally-biased cover. McNerney fits a sleeve of heat shrinkable material over a portion of his wire connector so that after a wire connection is made the heat shrinkable material can be shrunk fit around his connector to improve the bond to his connector and around the wires in order to prevent contaminants from entering the wire splice in his wire connector. In order to have ridges for gripping McNernery points out a tube of heat shrinkable material tightly grips his hard shell so as to replicate the grooves in the hard shell of his connector. Unfortunately, tightly shrinking the material around the body of connector introduces a circumferential bias or tension force in the heat shrunk material thus rendering material which may even be soft into a covering that is hard to the touch and is reluctant to yield to finger torque. Thus the heat shrunken tube on the body of his wire connector produces an external surface that resists resilient displacement and is also hard and is uncomfortable in response to the finger and hand pressure of the user since the tension and bias forces introduced by the heat shrinking limit the yielding of his material. That is, by stretching the material around the connector McNerney biases the material much like a spring under tension has an inherent bias. The bias introduced by the heat shrink process can prevent heat shrunk material from yielding equally in all three axis. Consequently, the heat shrinkable material in effect becomes like a stretched spring, which has increased resistance to stretching. The effect is to form an elastomer material into a hard cover or non resilient cover on a hard shell since a heat shrunk cover is limited in its ability to absorb external finger pressure. In addition any protuberances on the hard shell are carried through and become hard protuberances on the heat-shrunk layer. McNerney espouses the hardness of his heat-shrunk cover by pointing out that heat shrinking can produce a rigid case for his coil spring. In contrast to McNerney the present invention provides a cover to a twist-on wire connector that eliminates the problems generated by McNerney heat shrunk cover.

SUMMARY OF THE INVENTION

Briefly, the invention comprise a twist-on wire connector having a free standing cover that extends over the normal hand gripping region and at least part or all of the normal non-hand gripping region of the twist-on wire connector so that regardless of the manner the twist-on wire connector is grasped the user fingers engage a resilient cover to inhibit finger and hand injury and fatigue from repeated securement of twist-on wire connectors to electrical leads.

The present invention provides an improved twist-on wire connector wherein the entire exterior portion of the shell, which might come into contact with the users hand or fingers, comprises a resilient grip that has multiple degrees of responsiveness to finger pressure. That is, the cover can resiliently compress radially inward to accommodate squeezing pressure from the user's fingers and can circumferentially and axially deflect through the shear resistance of the material to thereby comfortably accommodate the lateral twisting forces on the external surface regions of the cover. Consequently, for those persons who do not grasp the twist-on wire connector on the designated hand gripping regions or those users who normally grasp the wire connector on the designated hand gripping regions but because of cramped conditions or personal preferences, which require them to grasp only the end section of the wire connector, can now have the benefit of a cushioned grip for their fingers regardless of how they have to grasp the twist-on wire connectors during the connection process.

A further feature of the invention is the surface securement of the finger friendly cover to the wire connector hard shell which allows one to retain the inherent characteristics of the resilient cover since internal forces are not introduced into the cover as a result of securement of the cover to the wire connector.

A further feature is that the use of a cushioned cover over the entire exterior portion of the shell that a user's fingers can come into contact with provides an added benefit as the cushioned covered twist-on wire connector is pushed back into the junction box. That is, the exterior surface of the twist-on wire connector can contact or rub against the insulation on the electrical wires as the wire connector is forced into the junction box. With the use of a resilient material or cushioned cover on the exterior surface of the twist-on wire connector it reduces or inhibits the opportunity to accidentally damage the insulation on the other wires if the twist-on wire connector contacts or rub against the electrical insulation on the other wires.

A further benefit of having a cushioned cover on the exterior surface of the connector hard shell is that it insures that the operator can apply maximum finger torque to the twist-on wire connector. That is, if the twist-on wire connector has a hard surface or a surface that is partly covered with a softer covering the tendency exists for the user to limit the torque due to the harsh engagement of the user's fingers with the hard portions of the shell of the twist-on wire connector. Because the present invention uses a cushion on the exterior portion of the shell the problem of torque limitation due to an operator consciously or unconsciously holding back on the twisting torque because of harsh contact between fingers and a hard portion of the twist-on wire connector is eliminated. As a result one can generally obtain more clamping force on the wire junctions in the wire connector which results in a cooler junction between the wires in the twist-on wire connector.

A further benefit is that the cushioned cover on the exterior portion of the shell can provide extra electrical insulation. That is, in certain applications one may want to handle higher voltages. With the exterior portion of the shell covered with a resilient material that has enhanced electrical insulating qualities one can provide a twist-on wire connector suitable for a wider range of voltages.

A further benefit is that wire connectors having heat shrinkable materials on the hard shell of the wire connector can also be made finger friendly. That is, the biased of the heat shrunk material can be overcome by placing a layer of surface secured resilient material over the heat shrunk material to form a cushioned cover over the heat shrunk material.

A further benefit of the invention is that the cover can be formed with flexible ribs formed entirely from the resilient material of the cover.

DESCRIPTION OF THE PREFERRED EMBODIMENT

Figure 1:
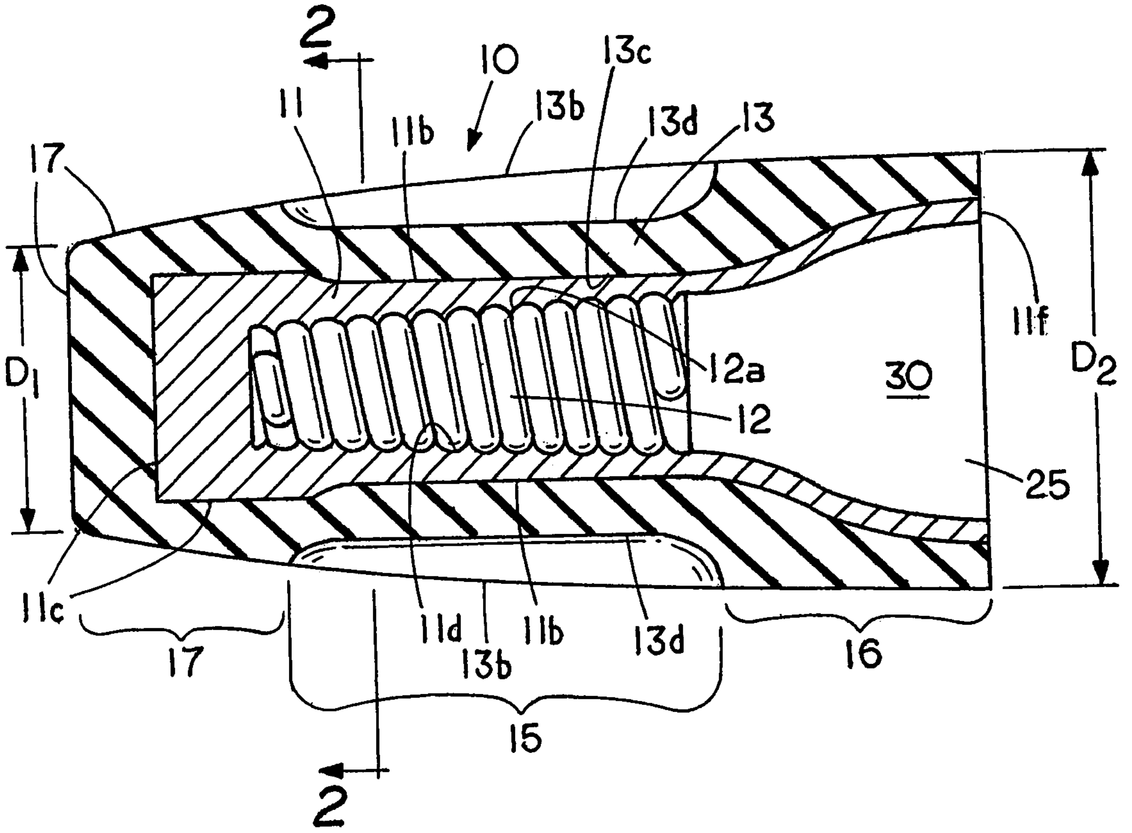
FIG. 1 is a section view of a twist-on wire connector with a cushioned cover.
Figure 2:
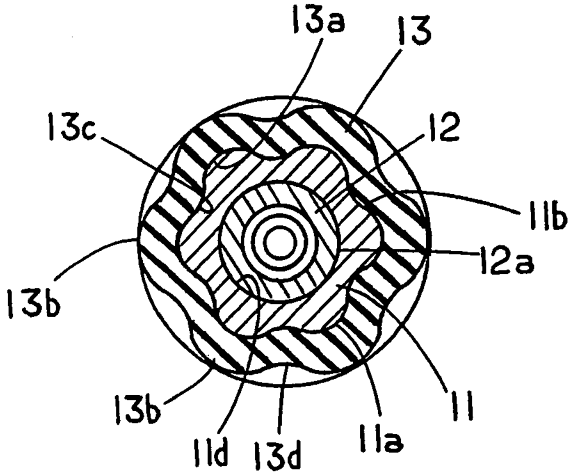
FIG. 2 is a section view of a twist-on wire connector of FIG. 2 taken along lines 2-2 of FIG. 1.

Referring to the drawings, FIG. 1 shows a cutaway view of a wingless, twist-on wire connector 10 having a closed end and an open end for insertion of electrical wires therein and FIG. 2 shows a section view taken along lines 2-2 of FIG. 1.

Wire connector 10 includes a rigid internal shell 11 with an open end 25 and a closed end, the shell having an interior surface 11*d* for engagement with wire coil 12 and an overmolded soft shell or cushioned cover 13 with a closed end 11*c* and an open end 25. The hard shell 11 is conventionally used on the exterior of twist-on wire connectors and usually contains ribs, reliefs, grooves or wings to enhance the users grip of the twist-on wire connector. That is, to apply a twist-on wire connector the user rotates the twist-on wire connector with one hand while the wires are held firmly in the other hand. The result is that the wire ends are twisted into electrical engagement with each other in the spiral thread of the twist-on wire connector.

Located circumferentially around and encapsulating the closed end and the circumferential portion of hard shell 11 is an overmolded layer or cushioned cover 13 that provides a cushioned surface on the exterior of hard shell 11. FIG. 1 shows cushioned cover 13 includes a normal circumferential hand gripping region 15, a circumferential base 16 and an end section 17. FIG. 2 shows that when the cushioned cover 13 is molded over the hard shell 11 the ridge 11*a*, the grooves or relief regions 11*b* on the hard shell 11 are carried through and become part of the cushioned cover 13 through corresponding ridge 13*b* and groove 13*d* therein. FIG. 2 also illustrates how the circumferential spaced grooves 11*a* and ridges 11*b* mate with corresponding ridges 13*b* and grooves 13*c* of cushioned cover 13 to form a mechanical interlock therewith as the ridges and grooves are carried into the cushioned cover 13.

Circumferential base 16 is not normally used as a hand gripping region but can be used as a hand gripping region in those instance when greater hand torque is required since the diameter $D_2$ is generally larger than the end diameter $D_1$. In some cases the base 16 is provided with grooves or wings to enable a user to apply greater hand torque to the wire connector. On the other hand end section 17 on the closed end is considered a normal non-hand gripping region. One of the reasons end section 17 is considered a non hand gripping region 17 is that in conventional hard shell twist-on wire connectors rigid end can be used for securing a tool thereto to aid in tightening the twist-on wire connector 10; however, as Blaha points out most electricians do not bother to use a tool since the fingers are the quickest most convenient way to secure a twist-on wire connector but he still maintains the ends of his hard shell free of any cushioned material thereby allowing one to use a tool on the end of his hard shell.

FIG. 1 shows the open end of rigid shell 11 includes an annular end surface 11*f* and a chamber 30 thereon for encompassing the wires that are in engagement with the spiral thread which can be formed from a wire coil 12 or in some instances can be integral to and with the hard shell of the twist-on wire connector. The normal hand gripping region 15 of shell 13 contains a set of longitudinally extending elongated ribs 13*b* and longitudinally extending elongated reliefs 13*d* that are positioned proximate to each other to enhance a user grip with the ribs 13*b* and reliefs 13*d* located on the central portion of wire connector 10. Located on an interior surface of hard shell 11 is a spiral thread formed from a wire coil 12. Wire coil 12 is secured to shell 11 so that rotation of shell 11 carries wire coil 12 therewith.

In the embodiments shown in FIG. 1 and FIG. 2 a resilient material, such as an elastomer forms the cushioned cover 13. The cushioned cover 13 extends from the open end 25 to and over the closed end 11*c* of the hard shell 11. That is, the elastomer 13 extends from an open end 25 of wire connector 10 to encompass the closed end of hard shell 11. The cushioned cover 13 comprising an overlayer of soft to the touch material that includes a normal hand gripping region 15, a circumferential base region 16 as well as portions or all of the normal non-hand gripping regions 17 which cover the closed end 11*c* of the wire connector 10. The cushioned cover 13 comprises a layer of resilient material having sufficient compressibility so as to flex to provide a cushion to a user's fingers or hand as the user squeezes thereon but sufficient strength so as not to tear when hand torque is applied to the cushioned cover 13 as the twist-on wire connector is secured to a set of wires. That is, the cushioned cover 13 has sufficient shear strength so as to resist separating as the user grasps the cushioned cover 13 to rotate, the cushioned cover 13, the rigid shell 11 and the wire coil 12 as a unit. As can be seen in FIG. 1 and FIG. 2 the cushioned cover 13 of resilient material includes not only the normal hand gripping region 15 and the base 16 but also the end section 17, which is normally provided with a hard shell so that a tool can be used to engage the end of the twist-on wire connector. However, one of the field difficulties in applying a twist-on wire connector is not in the torque required but it is the location that necessitates how the wire connector is grasped. For example, when connecting a wire connector to existing leads in junction box there maybe be a short length of wire to work with as well as a tight or cramped space to apply the wire connector. In those instance the user may only be able to grasp the end of the wire connector 10 in the normal non-hand gripping region 17 or partially on the normal hand gripping region 15 and partially on the normal non-hand gripping region 17 in order to twist the wire connector into engagement with the wires. With the present invention, if the user's fingers engage the normal non-hand gripping region 17, which contains the cushioned cover 13, the user is still provided with a cushioned finger support. Thus, with the present invention the user is provided a cushioned surface to grasp regardless of a grasping orientation of the twist-on wire connector. Ironically, it is the end section or the non-hand gripping region that is most difficult to grasp and twist since the twist-on wire connectors are conventionally made with the closed end smaller than the open end thus requiring a user to generate a large twisting force to obtain the necessary torque for securing the wire connector on a set of wires.

Thus, with a layer of tensionaly unbiased resilient material 13 secured to and extending over the exterior surface of the hard shell 11 one forms a finger friendly cover with the layer of resilient material 13 providing three axis deflection with sufficient compressibility so as to comfortably compress in response to radial finger pressure and to laterally deform in response to finger torque regardless of a finger grasping position on the cover 13. By having a layer of cushioned material having sufficient shear resistance so as to resiliently yield without tearing when a hand torque is applied to the cover one is assured that the wire connector can be comfortably applied with hand or finger torque.

Figure 2A:
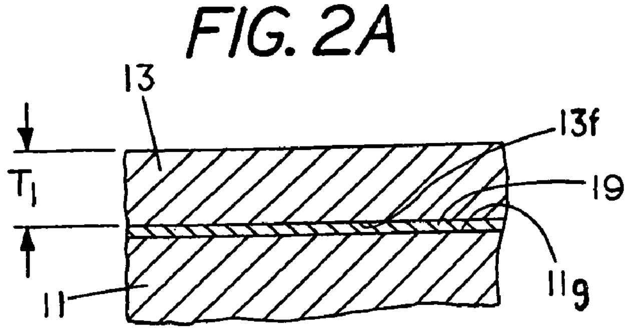
FIG. 2A is a partial sectional view of a cushioned cover which is surface secured to a twist-on wire connector with the cushioned cover in a relaxed state.
Figure 2B:
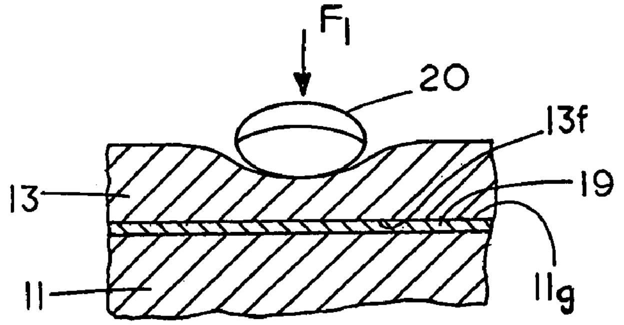
FIG. 2B is a partial sectional view of a cushioned cover secured to a twist-on wire connector of FIG. 2A with the cushioned cover in a partially compressed state.
Figure 2C:
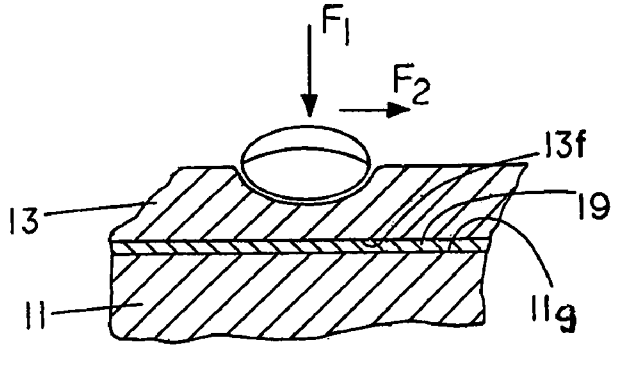
FIG. 2C is a partial sectional view of a cushioned cover secured to a twist-on wire connector of FIG. 2A with the cushioned cover also in a shear condition.

FIGS. 2A-2E illustrate surface securement of a cushioned cover 13 to a hard shell in a manner that allows the inherent characteristics of the cover 13 to be retained. A reference to FIG. 2A, 2B and 2C shows a portion of the hard shell 11 and a portion of the resilient cover 13 in various states. FIG. 2A shows the cushioned cover 13 in a tensionally unbiased condition with cushioned cover 13 secured to hard shell 11 by surface securement through a layer of adhesive 19 that extends along the interface between the surface 11*g* of hard shell and an internal surface 13*f* of cover 13. In the condition shown in FIG. 2A the body of cover 13, which is denoted by $T_1$, is in a free standing state or an unbiased condition and is responsive to lateral or radial forces in any direction since the only securement of the cushioned cover to the hard shell 11 is through a surface securement of surface 13*f*. By free standing, as used herein, it is meant that the material comprising the cover is substantially devoid of any internal tension forces that would limit the deflection of the elastomer as opposed to heat shrunk material which contains internal tension forces induced as a result of the heat shrinking process. FIG. 2B shows a finger 20 exerting a downward force $F_1$ that causes the cushioned cover 13 to resiliently respond to the radial pressure by deflecting radially inward.

FIG. 2C shows what occurs when a rotational twisting force is also introduced onto the cover 13. The twisting force $F_2$ brings the cover 13 into a shear condition wherein the shear resistance of the material comprising the cover 13 provides a resilient deflection of the cover 13. As the cover 13, as illustrated in FIG. 2A, is in an unbiased condition the cover is free to yieldably respond to laterally twisting forces as well as radially compressive forces thus providing the user with a comfortable gripping action on the wire connector.

Figure 2D:
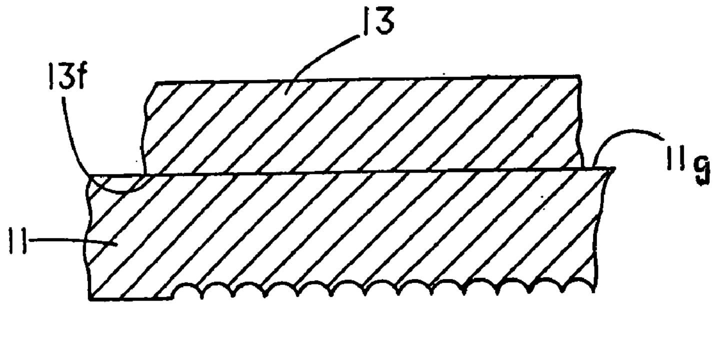
FIG. 2D is a partial sectional view of a cushioned cover molded to a twist-on wire connector with the cushioned cover in a relaxed state.

FIG. 2D is a partial sectional view of a cushioned cover 13 molded to a twist-on wire connector 11 with the cushioned cover in a relaxed or free standing state since no internal forces have been generated in the cover. In this embodiment the surface securement is obtained by having the under surface 13*f* of cushioned cover 13 secured directly to the exterior surface 11*g* of hard shell 11 while the body of the cushioned cover is in a free standing state. The surface securement shown in FIG. 2D can be obtained by molding the layer of cushioned material 13 directly to the surface 11*g* of the hard shell 11. Having the cushioned cover 13 in the relaxed or unbiased state places the cover in a condition to respond to gripping forces in any of the three axis as there are no bias or tensional forces to overcome.

Figure 2E:
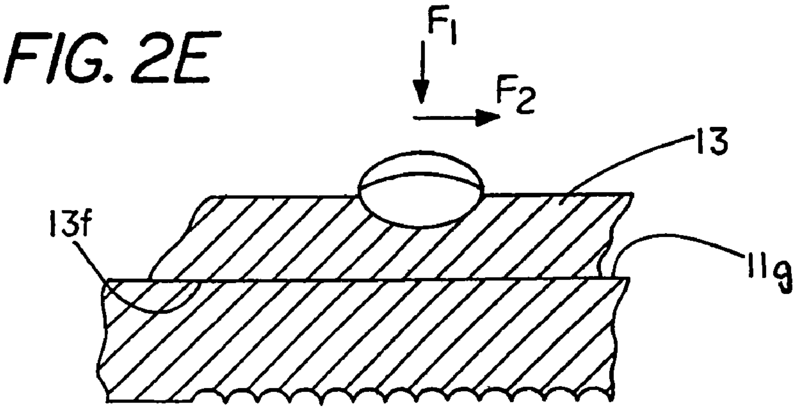
FIG. 2E is a partial sectional view of a cushioned cover molded to a twist-on wire connector of FIG. 2D with the cushioned cover in a shear and compressed condition.

FIG. 2E is a partial sectional view of a cushioned cover 13 molded to a twist-on wire connector 11 of FIG. 2D with the cushioned cover in a gripped condition. In the gripped condition the cushioned cover is in a shear condition as indicated by the force arrows $F_2$ and in a compressed condition by the force $F_1$. As bias or tensional forces from heat shrinking or the like are not present the full resiliency of the material comprising the cushioned cover 13 can be used to provide a cushion to the users fingers.

Figure 3:
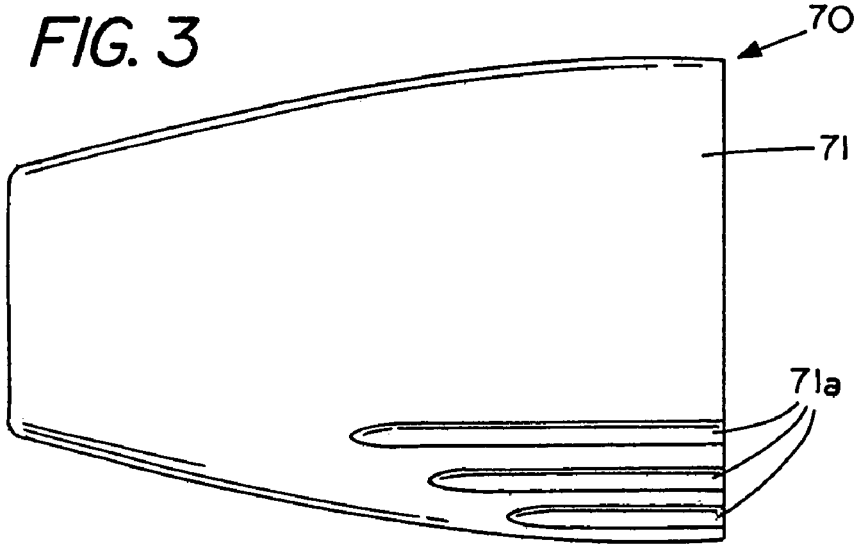
FIG. 3 is front view of the twist-on wire connector with the cushioned cover having a set of protrusions with grooves therein.

FIG. 3 is front view of the twist-on wire connector 70 revealing a set of grooves 71*a* extending parallel along the cushioned cover 71 which to provide an enhanced grasping region.

Figure 3A:
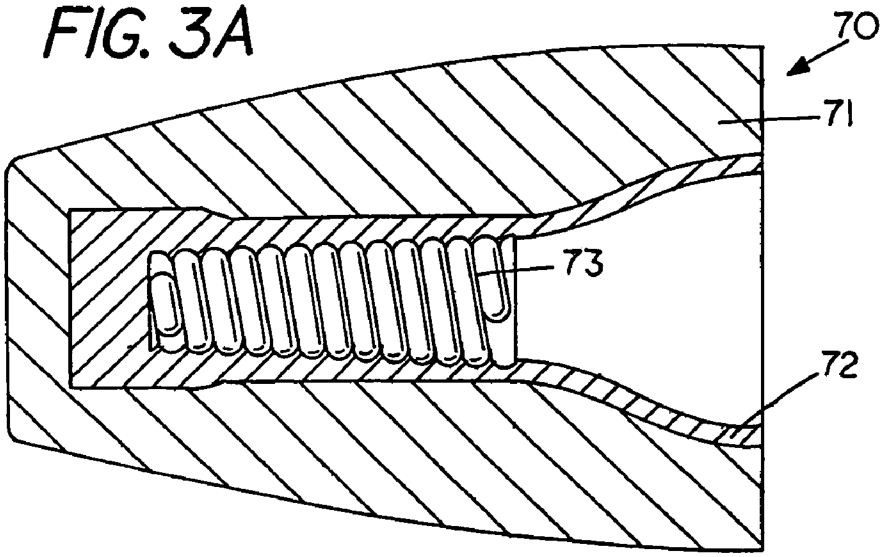
FIG. 3A is a sectional view of a twist-on wire connector of FIG. 3.

FIG. 3A is a sectional view of a twist-on wire connector 70 with a cushioned cover 71 located externally to a hard shell 72 which harbors a spiral wire coil 73.

Figure 3B:
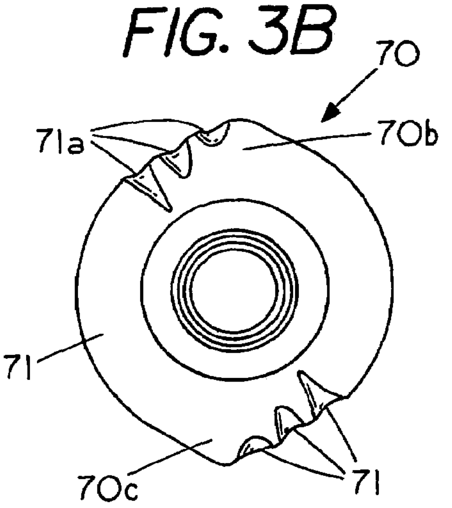
FIG. 3B is a top view of the twist-on wire connector of FIG. 3.

FIG. 3B is an end view of the twist-on wire connector 70 having an elliptical end shape. The cushioned cover 71 has an enhanced gripping region 71 including a lobe 70*b* on one side of the twist-on wire connecter and a lobe 70*c* on the opposite side of the cushioned cover 71. A set of grooves 71*a* are located in lobe 70*b* on one side of cushioned cover 71 and a second set of grooves 71*c* are located on lobe 71*c* on the diametrical opposite side of cushioned cover 71. In this embodiment the hard shell 72 can be kept free of wings or ridges to further ensure the operator can apply a twist-on wire connector with as little finger fatigue as possible as the external lobes of the cushioned material can be used to aid in grasping and twisting the wire connector into electrical engagement. In this embodiment the cushioned cover 71 is provided with enhanced gripping regions partly through the use of a non-circular base shape as well as the use of the lobes 70*b* and 70*c*. Cover 71 is a one piece wherein the cover has a base thickness greater in a first axis then in an orthogonal axis to form integral lobes 70*b* and 70*c*.

Figure 4:
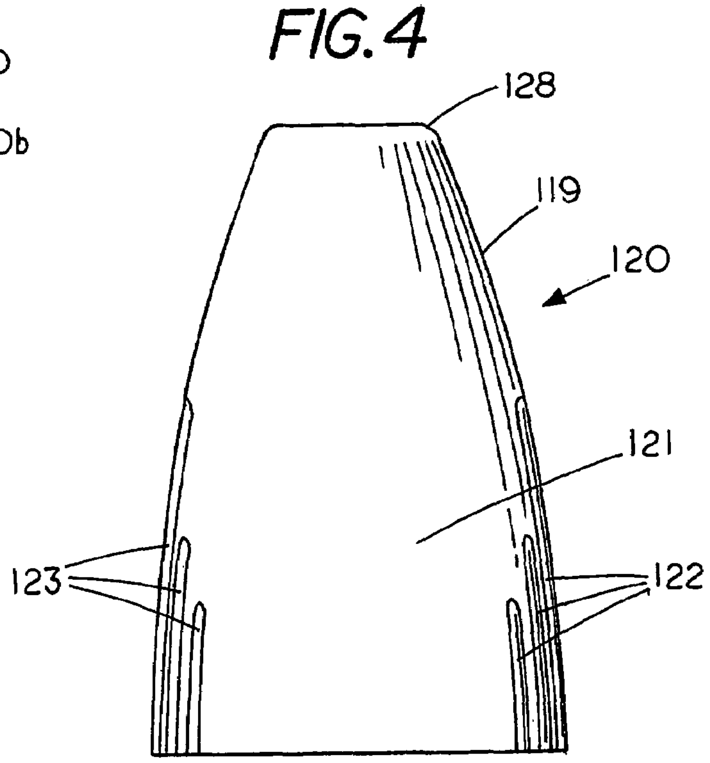
FIG. 4 is a front view of a twist-on connector having flexible ribs proximate the base.
Figure 4A:
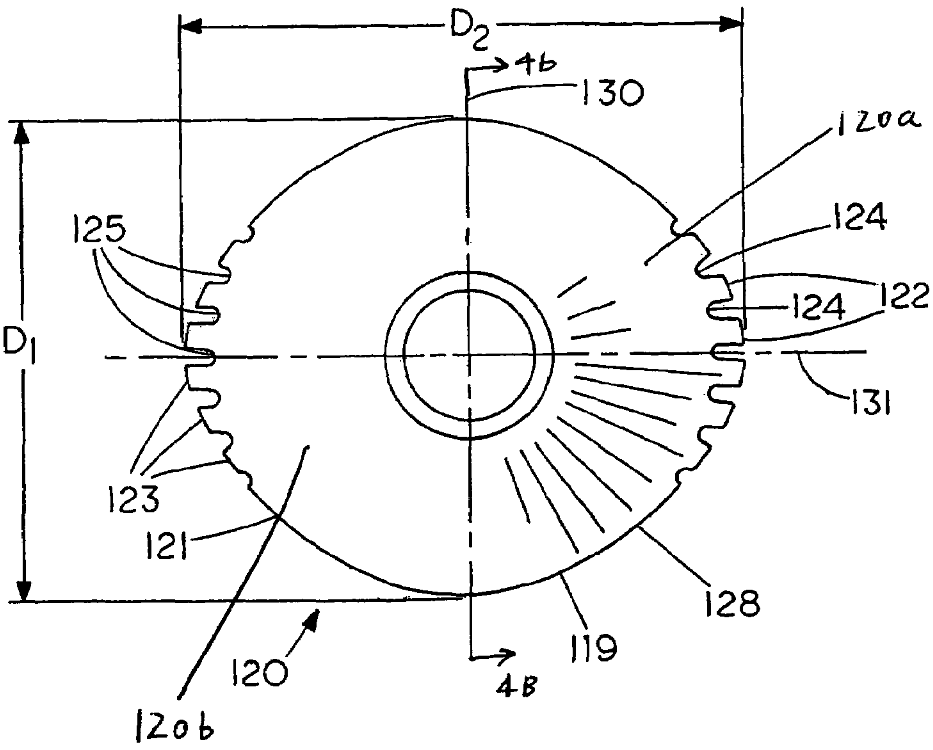
FIG. 4A is a top view of the twist-on wire connector of FIG. 4.

FIG. 4 shows a front view of a covered twist-on wire connector 120 having a cushioned cover 119, a top or closed end 128 and a base 121 having a non-circular shape. Located in base 121 and diametrical opposite to each other are a first set of axially extending elongated tapered ridges or ribs 122 and a second set of axially extending elongated tapered ridges or ribs 123. FIG. 4A shows cover 120 is a one-piece cover wherein the cover has a base thickness greater in a first axis 131 then in an orthogonal axis 130. In this embodiment ribs 122 and 123 are formed on the integral lobes. By having the lobes with ribs therein it provides an enhanced cushion effect in the hand gripping region since the ribs 122 and 123 are located on top of a layer of resilient material. Thus, a twist-on wire connector is provide with two different levels of cushion support, a normal cushion of resilient material over the normal non-hand gripping regions and a greater cushion located over the conventional hand gripping region of the twist-on wire connector to allow the cushion itself to function as a rib. FIG. 4A shows a top view of the covered wire connector with the cover 119 including a first integral lobe 120*a*, a second integral lobe 120*b*, a circular top or closed end 128, and an elliptical shaped base 121 having a major diameter $D_2$ which extends along major axis 131 and a minor diameter that extends along axis 130. Located on one side of cover 119 is the first set of flexible ribs 122 that are separated by a set of axially extending grooves 124 and located on the other end of cover 119 are a second set of flexible ribs 123 separated by a set of axially extending grooves 125.

Figure 4B:
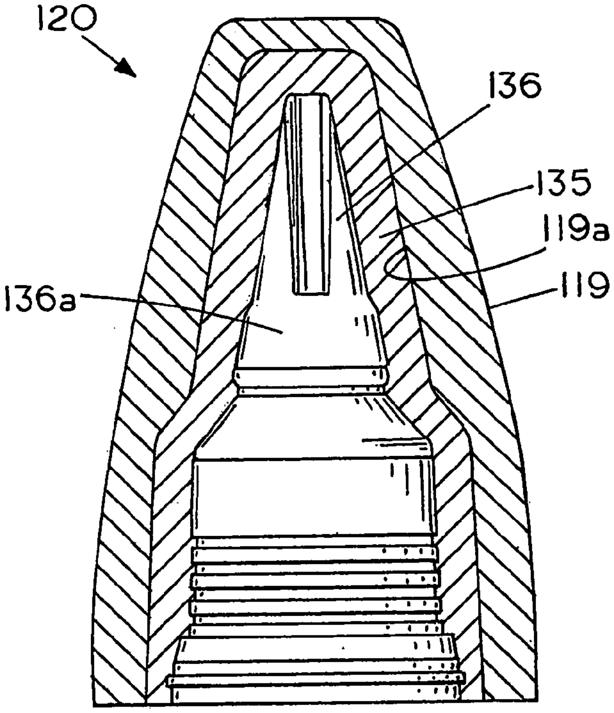
FIG. 4B is a section view of the twist-on wire connector of FIG. 4.

FIG. 4B shows a partial sectional view of cover 119 revealing the hard shell 135 covering extending between the exterior surface 136*a* of the spiral core 136. In this embodiment the cushioned material 119 varies in thickness to provide the dome-shaped appearance shown in FIG. 4.

Figure 4C:
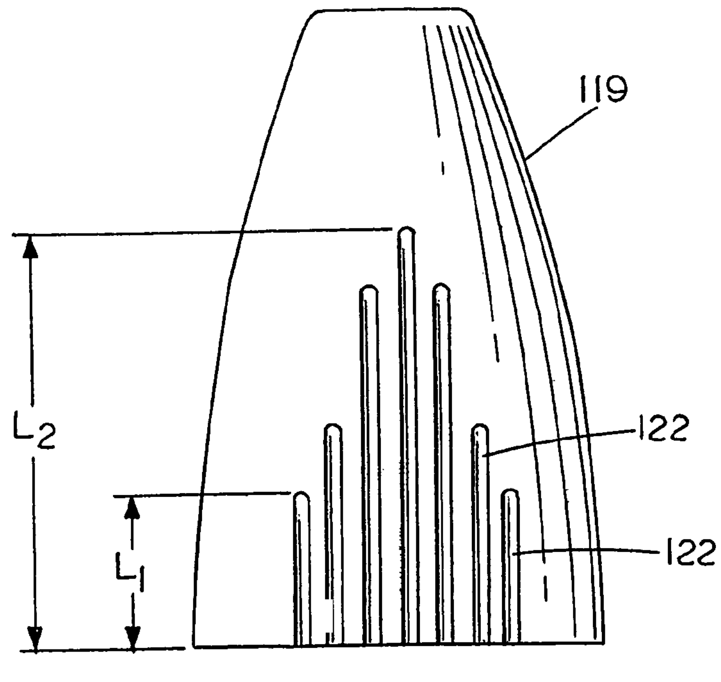
FIG. 4C is a side view of the twist-on wire connector of FIG. 4.
Figure 4D:
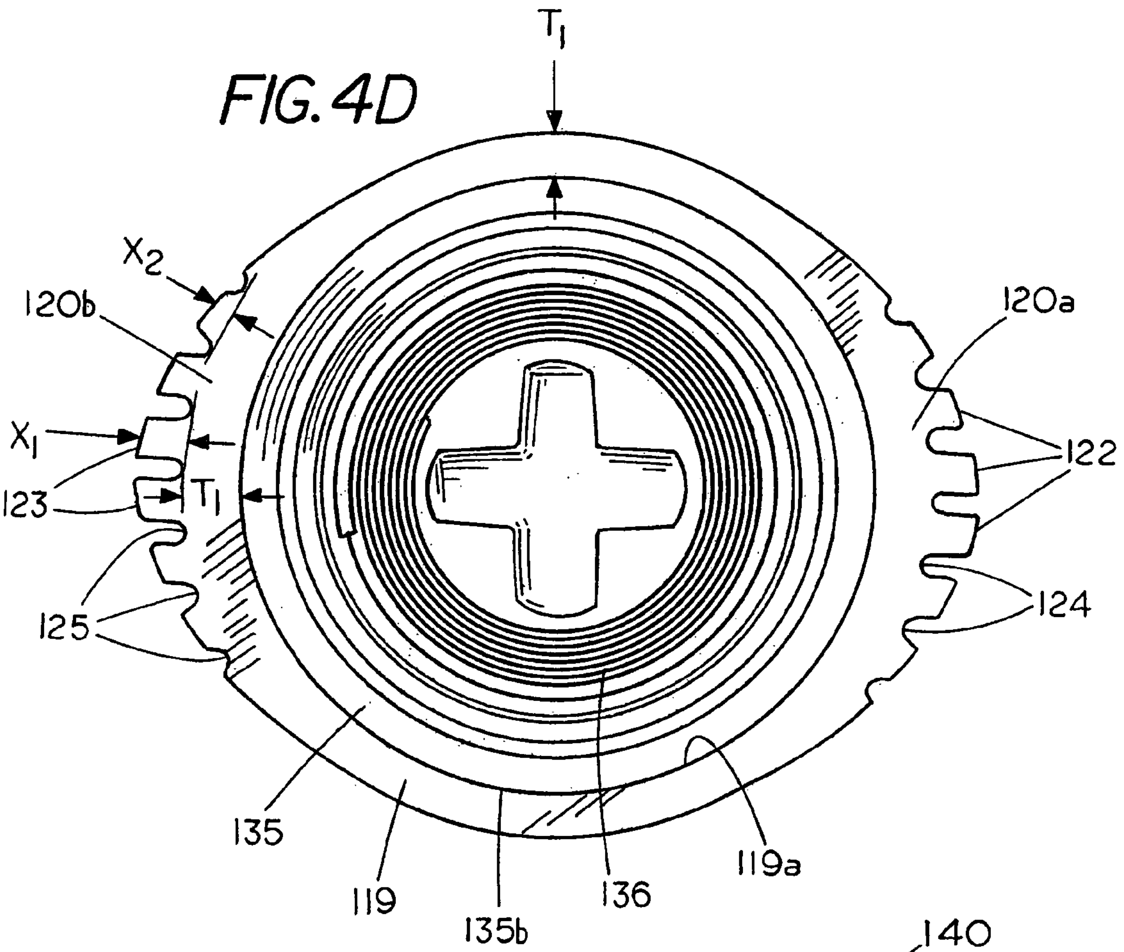
FIG. 4D is a bottom view of the twist-on wire connector of FIG. 4.

Thus, as shown in FIGS. 4-FIG. 4D, the wire connector 120 can have an insert with a hard shell 135 having a circular cross-sectional shape. To aid in the rotation of the twist-on wire connector the cover has been provided with lobes 120*a* and 120*b* that can carry flexible ribs 122 and 123. The lobed cover allows one to introduce longitudinally extending ribs that are completely formed from the resilient material in the cover. As a consequences the uncomfortable projection of an underlying rigid rib or rigid wing is eliminated since the hard shell contains no radially extending projections that would feel uncomfortable to the user even if covered with a cushion material.

FIG. 4C shows a side view of the wire connector 120 revealing the elongated ribs 122 that curvedly extend along the outer surface of the cover 119. The ribs extend from a distance $L_1$ on the outer ribs to a distance $L_2$ on the central rib thus providing greater finger rib engagement as the diameter of the base increases.

Cover 119 is preferable made from materials that are resilient to provide comfort when gripped by the user. One such type of material is a thermoplastic elastomer. Thermoplastic elastomers are available under the names Dynaflex and Versaflex and are sold by GLS Corporation Illinois of 723 West Algonquin Road Arlington Heights Ill. 60005. The Versaflex thermoplastic elastomer is well suited under wet conditions since it has good gripping characteristics even when wet. Another material suitable for use is a silicone rubber sold under the name Elastosil® by Wacker-Chemie AG of Munich Germany.

Thus, the twist-on wire connector 120, as shown in FIG. 4-FIG. 4D includes a hard shell 135 having a closed end 135*a*, a face 135*b* which is free of radial extending rigid projections such as ribs and wings and an open end 135*c* with a spiral core 136 located in the hard shell 135 to comprise the twist-on wire connector. In order to provide a cushion to the users hand or fingers located exterior to the hard shell 135 is a cover 119 comprising a body of a free-standing resilient material which can be an elastomer or the like that 119 completely encapsulates closed end 135*a* and circumferential face 135*b* of the hard shell, with the resilient material having an internal surface 119*a* fixedly secured to the spiral core 119 so that finger forces on the free-standing resilient material 119 allow the body of free-standing resilient material to yield so as to provide a cushioned support to a users hand or fingers regardless of a grasping orientation on the cover of resilient material.

As shown in FIG. 4 the ribs 122 and 123 on the cover are located on the radially extending protuberances to facilitate rotation of the twist-on wire connector while FIG. 4D shows a bottom view of the cover showing the cover having a thickness $T_1$ that extends peripherally around the wire connector with lobes 120*a* and 120*b* containing the elongated flexible ribs 123 and 122 which lack an underlying hard base such as found in ribs or wings. That is, instead of attempting to cover rigid ribs or rigid wings to provide a cushion grip the embodiment of FIG. 4 forms an integral resilient lobe on diametrically opposite sides of the cover 119 and includes flexible ribs 122 and 123 as part of the resilient cover that extends over the hard shell 135 that is free of radial protuberances that could be felt through the cover 119. Thus as shown in FIG. 4A-4D the cover 119 is one piece wherein a base thickness of the cover is greater in a first axis then in an orthogonal axis to form integral lobes 120*a* and 120*b* with each of the integral lobes including flexible ribs therein with the flexible ribs extended radially outward and unsupported by a rigid protrusion on the hard shell 135. As a result the cover can provide a soft or cushion feel to the user by using flexible ribs that are unsupported by rigid protrusions on the hard shell.

Figure 4E:
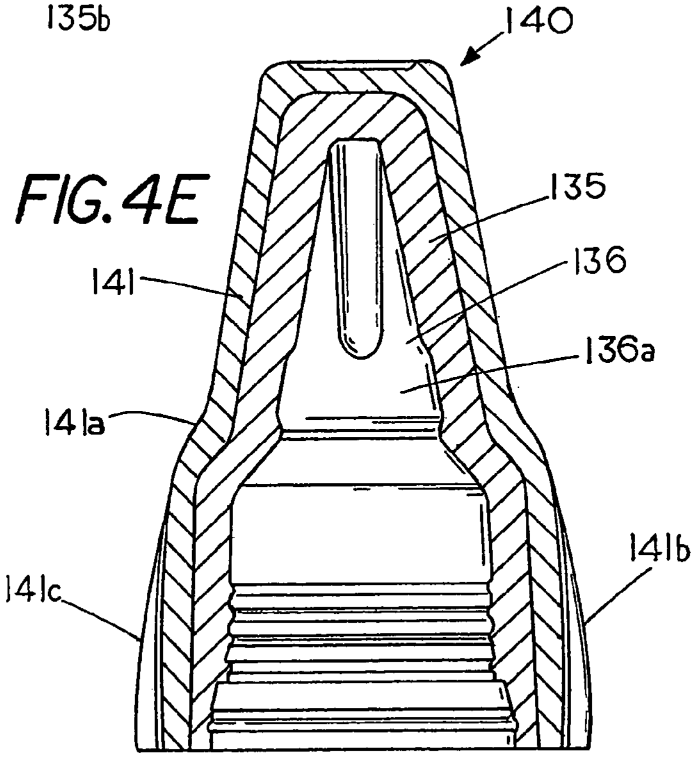
FIG. 4E is a side sectional view of a preferred embodiment of a twist-on wire connector with an annular shoulder.

FIG. 4E shows a sectional view of a preferred embodiment of the wire connector 140 which is similar to the wire connector 120. In the embodiment of FIG. 4E the core 136 and the hard shell 135 are identical to the core and hard shell of connector 120, which is shown in section in FIG. 4B. The cushion cover 119 shown in FIG. 4B has an exterior surface that smoothly curves from a closed end to the open end of cover 141 while the cushioned cover 141 shown in FIG. 4E has a uniform thickness over the exterior surface of the hard shell 135. Placing a cover of uniform thickness on the exterior surface of the hard shell 135 produces an annular shoulder 141*a* that extends around the wire connector 140 thus allowing one to use the shoulder 141*a* to axially force the wire connector onto the ends of wires. Extending radially outward from one side of wire connector 140 is a first set of integral elongated flexible ribs 141*c* and extending radially outward from the opposite side of wire connector 140 is a second set of integral elongated flexible ribs 141*b*. While the cushioned cover with the annular should is formed by conforming the cover of uniform thickness to the hard shell other methods of making an annular shoulder are within the scope of this invention.

Figure 5:
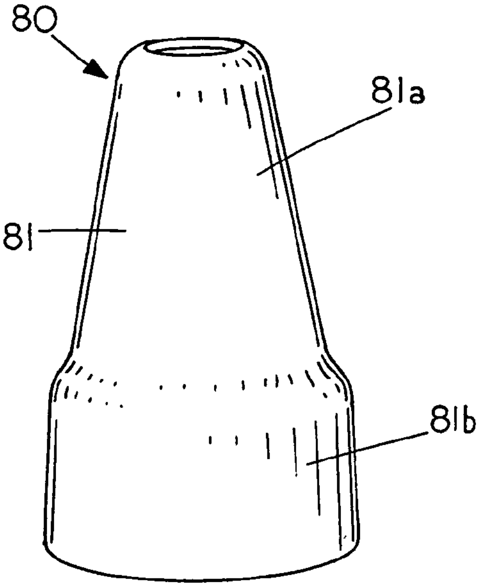
FIG. 5 is a perspective view of a twist-on wire connector without any ribs.

FIG. 5 is a perspective view of a twist-on wire connector 80 with an encapsulating cushioned cover 81 that is free of any ribs. Wire connector 80 has a top frusto conical shape section 81*a* and a lower cylindrical section 81*b* to allow a person to grasp the cushioned cover of the twist-on wire connector 80. The twist-on wire connector as illustrated in FIG. 5 is one piece and has a minimum thickness to provide a cushioned cover, While the minimum thickness can vary with the resilient material with most resilient materials a minimum thickness of at least 0.020 inches is sufficient to provide a cushioned cover.

Figure 6:
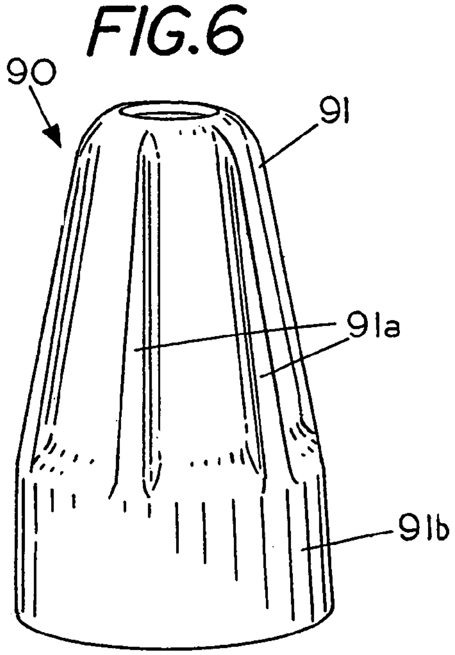
FIG. 6 is a perspective view of a twist-on wire connector with a set of equally spaced apart ribs.

FIG. 6 is a perspective view of a twist-on wire connector 90 with a cushioned cover 91 containing a set of equally spaced apart ribs 91*a* and a smooth cylindrical base 91*b*. In the embodiment shown the ribs 91*a* have been formed directly into the cushioned material 91 on top of a hard shell that is free of protuberances such as wings or the like.

Figure 6A:
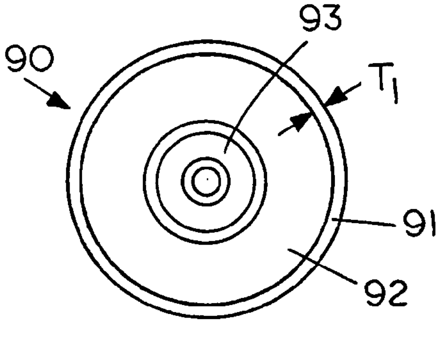
FIG. 6A is an end view of the twist-on wire connector of FIG. 6.

FIG. 6A is an end view of the twist-on wire connector of FIG. 6 showing the hard shell 92 with the spiral coil 93 secured therein. Located on the exterior surface of shell 92 and surface secured thereto is the cushioned cover 91 having a thickness $T_1$ which is free of bias forces.

Figure 7:
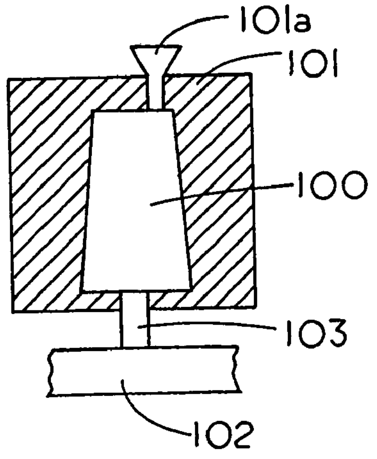
FIG. 7 shows a twist-on wire connector in a mold after forming an outer hard shell of the twist-on wire connector.

FIG. 7 shows a twist-on wire connector hard shell 100 being molded in a spilt mold 101 having an inlet 101*a* for introducing material to form the moldable hard shell 100. A mandrel 103 sets on a rail 102 that carries the hard shell 100. Once the hard shell 100 has been formed in mold 101 the mold 101 is opened to allow removal of the hard shell 100 by displacement of the rail 102, which supports the mandrel 103, the hard shell 100 can be placed in a further mold after forming an outer hard shell of the twist-on wire connector.

Figure 7A:
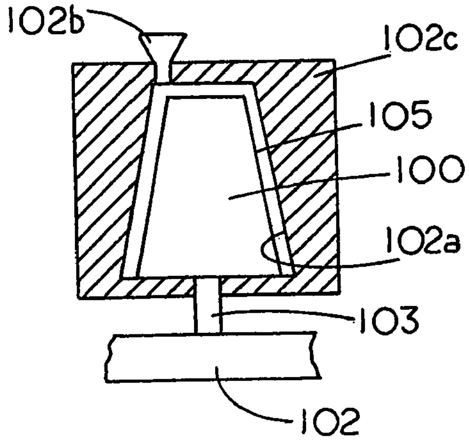
FIG. 7A shows the hard shell of the twist-on wire connector of FIG. 7 in a further mold in a condition to receive a molded overlayer of cushioned material.

An alternate molding of the two layers of material comprise using a two component injecting molding machine wherein in the first step a layer of material such as the hard shell is formed in a first cavity in the mold, after cooling the mold is opened and the molded article is rotated and inserted into a second cavity in the mold where the second layer of molten material is applied over the first layer of molded material FIG. 7A shows the hard shell 100 of the twist-on wire connector of FIG. 7 in a further mold 102*c* having a mold inlet 102*b*. In this condition a gap 105 extends between the exterior surface of the hard shell 100 and the interior surface 102*a* of mold 102. The hard shell 100 is centrally supported by mandrel 103 and rail 102 in a condition to receive a molded overlayer of cushioned material by injection molten material into gap 105 through spout 102*b*. Thus in this embodiment the interior surface of the cushioned cover is secured to the exterior surface of the hard shell by an overmolding process thus allowing one to form a cover that remains in an unbiased condition since only the surface of the cushioned cover is secured to the hard shell.

Figure 8:
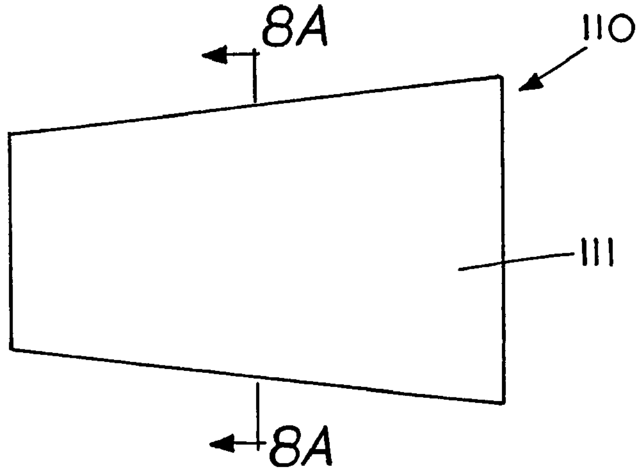
FIG. 8 shows a front view of an embodiment of a twist-on wire connector with a mechanical interlocked cushioned cover.

FIG. 8 shows a front view of another embodiment of a twist-on wire connector 110 that is surface secured with through a mechanically interlocked cushioned cover 111. In this embodiment the cushioned cover is retained by a mechanical engagement of protrusions on the inner surface of the cushioned cove 111 and recess in the hard shell, however, the material comprising cushioned cover 111 remains in an unbiased or free standing condition.

Figure 8A:
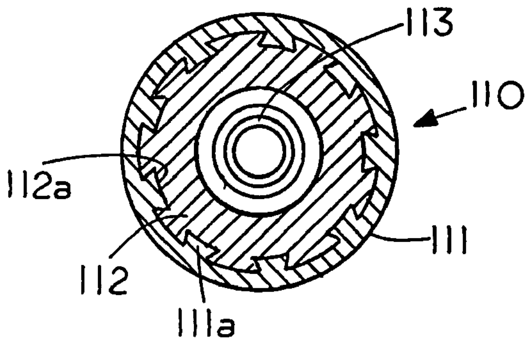
FIG. 8A shows a cross sectional view of the twist-on wire connector of FIG. 8 revealing the mechanical interlock.

FIG. 8A shows a cross sectional view of the twist-on wire connector 110 taken along liens 8A-8A of FIG. 8. In the embodiment shown a set of axially extending dovetail grooves or recess 112*a* are formed in the hard shell 112, which carries the spiral coil 113 therein. The cushioned cover 111 contains a set radially extending dovetails 111*a* that interlock with the dovetail grooves 112*a* in the hard shell. In this embodiment a portion of the cushioned cover is retained within the grooves; however, the cushioned cover can still be retained in an unbiased condition since it is unnecessary to introduce bias forces into the cushioned cover 111 to retain the cover on the wire connector.

Figure 9:
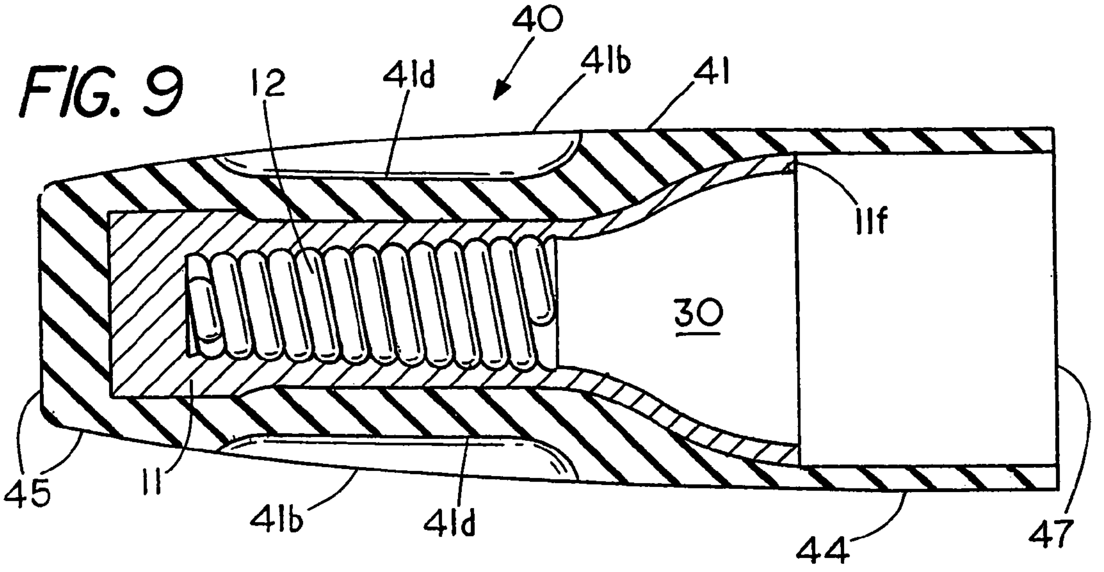
FIG. 9 is an alternate embodiment of the invention wherein the twist-on wire connector includes a skirt.

FIG. 9 shows an alternate embodiment of the invention wherein the hard shell 11 and wire coil 12 are identical to those shown in FIG. 1 and FIG. 2; however, the cushioned cover 41 extends beyond end 11*f* to provide an integral deformable skirt 44 with an open end 47 for insertion of wires therein. Deformable skirt 44 is unsupported by the hard shell 11. The use of a flexible skirt is shown in U.S. Pat. No. 5,142,494 wherein he attaches a separate flexible skirt to the hard body of his twist-on wire connector. However, with the embodiment of FIG. 9 the cushioned cover not only covers the hard shell 11 it forms a one-piece cover with integral deformable skirt.

Figure 9A:
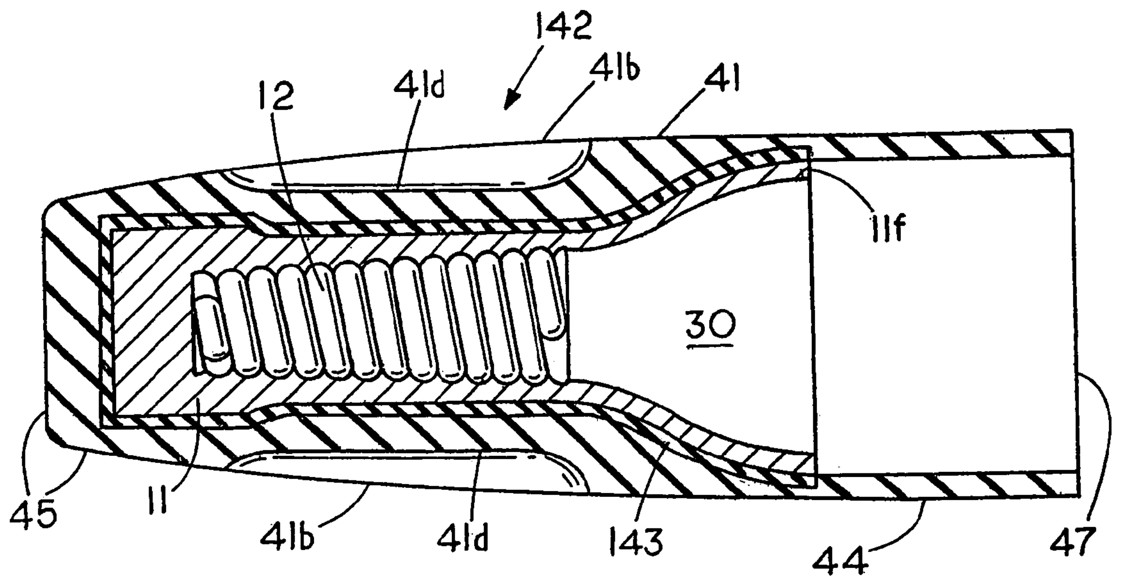

FIG. 9A shows an alternate embodiment of the invention comprising a wire connector 142 having similar components to the wire connector 40 shown in FIG. 9. However, wire connector 142 includes a layer of heat shrinkable material 143 located between the hard shell 11 and the cushioned cover 41. Cushioned cover 41. similar to the cushioned cover 13 of FIGS. 1 and 2. is formed from tensionally unbiased cushion material.

Figure 10:
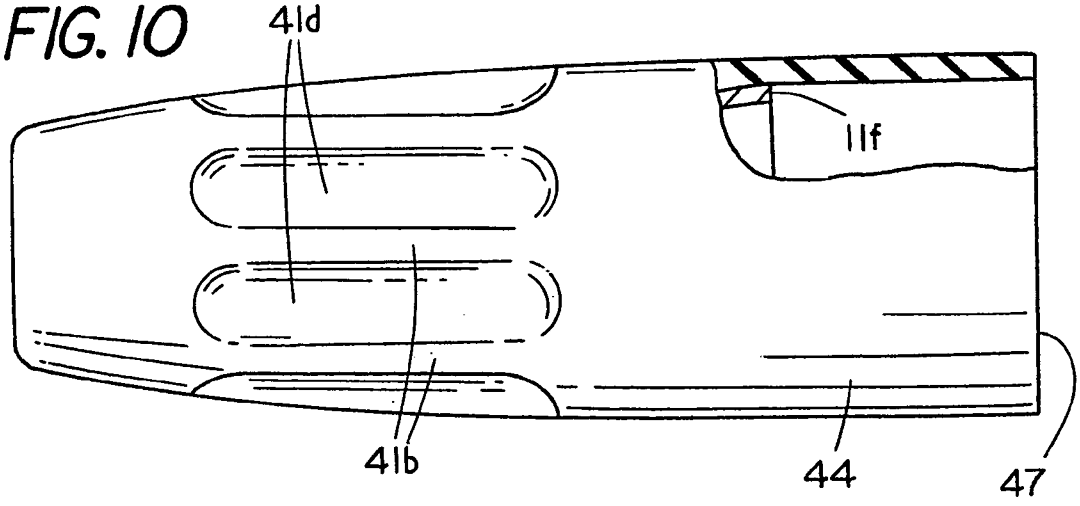
FIG. 10 is a partial cut-away view of the embodiment of FIG. 9.

FIGS. 10 shows a partial cutaway view of the twist-on wire connector of FIG. 9 to reveal the exterior ridges 41*b* and grooves 41 that extend around the peripheral region of the central portion of wire connector 40.

Figure 11:
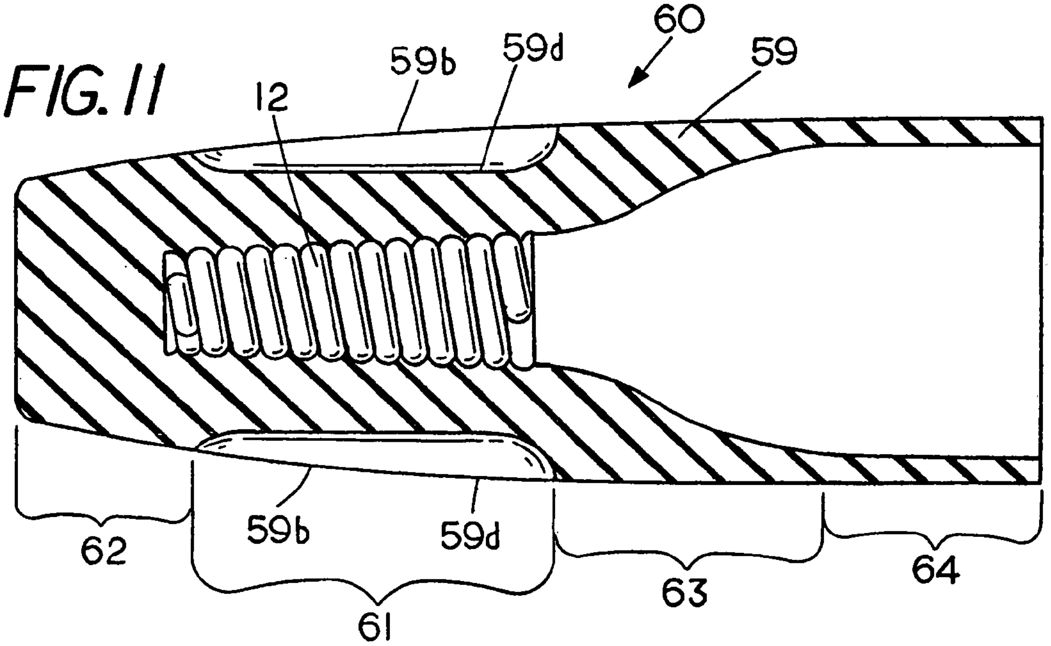
FIG. 11 is a partial sectional view of an alternate embodiment of a twist-on wire connector with a cushioned grip.

FIG. 11 shows an alternate embodiment of a wire connector 60 having a one piece external cushion shell 59 with a wire coil 12 secured therein. In the embodiment shown in FIG. 11 the internal hard shell has been dispensed with and replaced with a cushioned material. The cushioned material comprises an electrically insulating material that flexes in response to finger pressure thereon to as to increase the contact area between the users fingers while avoiding edges that can cause pressure sores on a users fingers during repeated applications of the wire connector. In the embodiment shown in FIG. 5 the wire connector shell 59 is secured directly to the wire coil 12 with an adhesive or the like. The elastomer shell 59 surrounds the wire-engaging coil 12 with the elastomer shell including longitudinal ridge 59*b* and longitudinal grooves 59*d* to enhance a users grip. As the shell flexes in response to the user grasp the ridges and grooves provide tensional engagement with the users finger while at the same time providing a cushion so as minimize injury to the users fingers regardless of how the wire connector 60 is grasped.

In the embodiment shown in FIG. 11 the ridges 59*b* and grooves 59*d* are located in the normal hand gripping region 61 with the twist-on wire connector having an end region 62, which is a normal non hand gripping region, a base region 63 and an integral deformable skirt 64.

Thus the invention comprises a cushioned cover that includes a layer of tensionaly unbiased resilient material secured to and extending over the exterior surface of a twist-on wire connector to form a finger friendly cover with the layer of resilient material 13 providing three axis deflection with sufficient compressibility so as to comfortably compress in response to radial finger pressure and to laterally deform in response to finger torque regardless of a finger grasping position on the cover with the layer of resilient material having sufficient shear resistance so as to resiliently yield without tearing when the finger torque is applied to the cover.

The invention also includes the method of applying a twist-on wire connector while inhibiting finger fatigue by forming a cushioned cover over an exterior surface of a twist-on wire connector surface consisting of a normal hand gripping region and a normal non hand gripping region, finger compressing the cushioned cover at least partly in the non hand gripping regions and applying a finger shear force to the cushioned cover while finger compressing the cushioned cover to thereby rotate the twist-on wire connector into electrical engagement as the cushioned cover resiliently responds to the finger shear force.

The invention includes the further method of making a twist-on wire connector that is finger friendly by forming a hard shell with an exterior surface consisting of normal hand gripping regions and normal non hand gripping regions and an interior wire engaging surface and securing a surface of a resilient non-heat shrinkable cover to the exterior surface of the hard shell without generating internal bias forces in the cover.

Thus as described herein the cushioned cover can be surface secured by chemical bonding or ionic bonding to the hard shell with or without the presence of an intermediate layer or can be surface secured by a mechanical interlock while still allowing the resilient material comprising the cushioned cover to remain in a free-standing condition. In either case the intentional biasing of the cover on the hard shell is avoided.

A benefit of the wire connector with the cushion cover is that it also provides impact resistance that can protect the wire connector and lessen the chances of a blow to the wire connector causing wires therein to become loose. In addition it also lessens the chance of a wire becoming exposed due to an impact, which provides enhanced safety.

While the twist-on wire connector has been described in conjunction with conventional twist-on wire connectors the invention can also be used with sealant containing wire connectors.

We claim:

1. A finger friendly twist-on wire connector comprising:

a hard shell having a spiral thread therein and an exterior surface consisting of a normal hand gripping region and a normal non hand gripping region; and a layer of tensionally unbiased resilient material secured to and extending over said exterior surface to form a finger friendly cover, said layer of resilient material providing three axis deflection with sufficient compressibility so as to comfortably compress in response to radial finger pressure and to laterally deform in response to finger torque regardless of a finger grasping position on the cover with the layer of resilient material having sufficient shear resistance so as to resiliently yield without tearing when the finger torque is applied to the cover, said layer of resilient material includes a resilient skirt extending beyond a base of the hard shell and a layer of heat shrinkable material located between the hard shell and the layer of tensionally unbiased cushion material.

2. A finger friendly twist-on wire connector comprising:

a hard shell having a spiral thread therein and an exterior surface consisting of a normal hand gripping region and a normal non hand gripping region: and a layer of tensionally unbiased resilient material secured to and extending over said exterior surface to form a finger friendly cover, said cover is one piece wherein a base thickness of the cover is greater in a first axis then in an orthogonal axis to form integral lobes with each of the integral lobes including flexible ribs therein with the flexible ribs extended radially outward and are unsupported by a rigid protrusion on the hard shell, said layer of resilient material providing three axis deflection with sufficient compressibility so as to comfortably compress in response to radial finger pressure and to laterally deform in response to finger torque regardless of a finger grasping position on the cover with the layer of resilient material having sufficient shear resistance so as to resiliently yield without tearing when the finger torque is applied to the cover.

3. The twist-on wire connector of claim 2 including a layer of adhesive secured to the exterior surface of the hard shell and to an interior surface of the cover to maintain the cover an unbiased condition equally yieldable in all directions.

4. The twist-on wire connector of claim 2 wherein said cover is secured to the exterior surface by an ionic bond.

5. The twist-on wire connector of claim 2 wherein the cover is secured to the exterior surface of the hard shell by a mechanical interlock.

6. The twist-on wire connector of claim 2 wherein the cover has a minimum thickness of at least 0.020 inches with a set of lobes extending radially outward therefrom with each of the lobes carrying a set of elongated ribs integral to the cover and with each of the flexible ribs providing a gripping region.

7. The twist-on wire connector of claim 2 wherein the cover is chemically bonded to the hard shell without the presence of an intermediate layer.

* * * * *